(12) United States Patent
Mittal et al.

(10) Patent No.: US 9,803,058 B2
(45) Date of Patent: Oct. 31, 2017

(54) MEMBRANE WITH INCREASED DURABILITY FROM PARTIAL ION EXCHANGE

(75) Inventors: Vishal Onkarmal Mittal, Manchester, CT (US); Lesia V. Protsailo, East Hartford, CT (US); Sathya Motupally, Milford, CT (US)

(73) Assignee: Audi AG, Ingolstadt (DE)

( * ) Notice: Subject to any disclaimer, the term of this patent is extended or adjusted under 35 U.S.C. 154(b) by 835 days.

(21) Appl. No.: 12/736,659

(22) PCT Filed: Jun. 24, 2008

(86) PCT No.: PCT/US2008/007848
§ 371 (c)(1),
(2), (4) Date: Oct. 27, 2010

(87) PCT Pub. No.: WO2009/157894
PCT Pub. Date: Dec. 30, 2009

(65) Prior Publication Data
US 2011/0045382 A1    Feb. 24, 2011

(51) Int. Cl.
*H01M 8/00*    (2016.01)
*H01M 8/10*    (2016.01)
(Continued)

(52) U.S. Cl.
CPC ......... *C08J 5/2287* (2013.01); *H01M 8/1023* (2013.01); *H01M 8/1039* (2013.01);
(Continued)

(58) Field of Classification Search
CPC ............. H01M 8/0289; H01M 8/1023; H01M 8/1039; H01M 8/1067; H01M 8/1088
(Continued)

(56) References Cited

U.S. PATENT DOCUMENTS 2,636,852 A * 4/1953 McRae .................... B01J 47/08
                                                204/263
3,657,104 A    4/1972 Hodgdon, Jr.
(Continued)

FOREIGN PATENT DOCUMENTS

EP    1 788 655 A1    5/2007
JP    2004-161956    *  6/2004
(Continued)

OTHER PUBLICATIONS

Machine Translation of Oh et al. (KR 10-2001-0091642, published Oct. 2001, pp. 1-11).*
(Continued)

*Primary Examiner* — Kenneth Douyette
(74) *Attorney, Agent, or Firm* — Seed IP Law Group LLP

(57)    ABSTRACT

An ion exchange membrane (52) for a fuel cell comprises a polymer having an acid functional group normally including protons, and having alkali metal ions partially ion-exchanged with the protons of the acid functional group of the membrane. The partial ion exchange of alkali metal ions into the membrane relates either to patterning of the exchanged ion make-up of the membrane, with some being ion exchanged and some not, or to the extent or concentration of the ion exchange in any particular location, or to both.

15 Claims, 1 Drawing Sheet

(51) Int. Cl.
    *H01M 8/02*     (2016.01)
    *C08J 5/22*     (2006.01)
    *H01M 8/1023*   (2016.01)
    *H01M 8/1039*   (2016.01)
    *H01M 8/1067*   (2016.01)
    *H01M 8/1088*   (2016.01)

(52) U.S. Cl.
    CPC ....... *H01M 8/1067* (2013.01); *H01M 8/1088* (2013.01); *C08J 2381/08* (2013.01); *H01M 2300/0082* (2013.01); *Y02P 70/56* (2015.11)

(58) Field of Classification Search
    USPC .................................................. 429/483, 492
    See application file for complete search history.

(56) References Cited

U.S. PATENT DOCUMENTS

| | | | |
|---|---|---|---|
| 4,433,082 A | 2/1984 | Grot | |
| 4,752,370 A * | 6/1988 | McMichael | ............... C25B 9/10 204/282 |
| 6,861,173 B2 | 3/2005 | Bhaskar et al. | ................ 429/40 |
| 7,132,191 B2 | 11/2006 | Healy et al. | .................... 429/40 |
| 2004/0242708 A1 | 12/2004 | Hasegawa et al. | |
| 2005/0136308 A1 * | 6/2005 | Andrews et al. | ............... 429/30 |
| 2006/0241192 A1 * | 10/2006 | Kitamura | ............ H01M 8/0289 521/27 |
| 2006/0280985 A1 | 12/2006 | Toyoda et al. | ................... 429/33 |
| 2007/0099053 A1 | 5/2007 | Frey et al. | ....................... 429/33 |
| 2007/0117000 A1 | 5/2007 | An et al. | ......................... 429/33 |
| 2007/0196718 A1 | 8/2007 | Leistra et al. | |
| 2007/0212593 A1 | 9/2007 | Raiford et al. | |
| 2007/0218334 A1 | 9/2007 | Bonorand | |
| 2008/0038612 A1 | 2/2008 | Fay et al. | |

FOREIGN PATENT DOCUMENTS

| | | | |
|---|---|---|---|
| KR | 10 20010091642 | 10/2001 | |
| WO | 94/07274 A1 | 3/1994 | |
| WO | WO 2006/071234 A1 | 7/2006 | ............. H01M 8/02 |
| WO | WO2006071234 * | 7/2006 | ............. H01M 8/02 |

OTHER PUBLICATIONS

Machine Translation of Inoue et al. (JP 2004161956, published Jun. 2004, pp. 1-21).*

* cited by examiner

MEMBRANE WITH INCREASED DURABILITY FROM PARTIAL ION EXCHANGE

This application is a U.S. national stage entry under 35 U.S.C. §371 of International Application No. PCT/US2008/007848 filed Jun. 24, 2008. The entire contents of this application is explicitly incorporated herein by this reference.

BACKGROUND

The disclosure relates generally to ion exchange membranes, and more particularly to ion exchange membranes for use in electrochemical fuel cells, such as PEM fuel cells. More particularly still, the disclosure relates to such ion exchange membranes having increased durability.

A PEM fuel cell employs a membrane electrode assembly (MEA) in which the membrane is a proton exchange membrane, or polymer electrolyte membrane, (PEM). The membrane is disposed between anode and cathode electrodes respectively. The catalyzed cathode and anode serve to induce the desired electrochemical reactions. In addition to the aforementioned elements which comprise the membrane electrode assembly, there may be gas diffusion layers positioned outside of the electrodes. Cumulatively, these various elements comprise a unitized electrode assembly (UEA).

Reactants, typically an oxidant such as oxygen or air and a fuel such as hydrogen, are flowed over respectively opposite sides of the membrane to obtain the requisite electrochemical reaction. A seal about the perimeter of the membrane electrode assembly or the unitized electrode assembly normally serves to keep the reactants separate. This seal creates a non-active region portion to the membrane with respect to the desired electrochemical reaction.

The ion exchange membranes typically used in a PEM fuel cell have been polymer electrolyte membranes having cation exchange groups, and have included hydrocarbon-based membranes or those prepared from flouropolymers, and which contain sulfonic acid functional groups. A representative perflourosulfonic acid/PTFE copolymer membrane is available from DuPont Inc. under the trade name Nafion®.

From the standpoint of financial cost and system reliability, the durability and operational lifetime of a fuel cell are important. Unfortunately, failure modes may exist which have an adverse impact. One such mode involves the degradation of the membrane. This matter is discussed in PCT Application PCT/US2004/044013 having International Publication Number WO 2006/071234, which describes how oxygen may diffuse from the cathode to the anode through the membrane and can form peroxide by reacting with hydrogen at low potential at the anode catalyst surface. The peroxide can dissociate into highly reactive free radicals, which in turn may rapidly degrade the membrane. That published application describes an arrangement for extending not only the membrane, but also the catalyzed layers and possibly the electrodes into the non-active region associated with the edge seal. In this way, oxygen and/or hydrogen and any resulting peroxide which diffuses into the edge seal area are consumed by the catalyzed layers to prevent decomposition of the membrane.

U.S. application Ser. No. 10/738,962, published as U.S. Patent Application Publication 2005/0136308, describes the application of an additive non-uniformly to the MEA to address much the same problem. The additive is selected from "a radical scavenger, a membrane cross-linker, a hydrogen peroxide decomposition catalyst and a hydrogen peroxide stabilizer". A number of examples are provided of additives that may serve to provide at least one of the aforementioned four functions. The principal focus of these additives is to interact with hydrogen peroxide in a manner that reduces the adverse nature of the peroxide itself. It suggests that the additive(s) be located in regions of the membrane subject to greatest potential chemical degradation.

While some advantages may be realized through the use of one or both of the aforementioned arrangements, they nevertheless remain deficient with respect to long term stability and structural integrity, or durability. One particular adverse characteristic is membrane degradation, which may be monitored by measuring one or more parameters, such as the rate of fluoride release in the instance of a fluoropolymer-based membrane. Generally speaking, the greater the rate of fluoride release from such a membrane, the greater the rate of membrane degradation. This release of fluoride may be a function of the formulation of the membrane material and is, for a given material formulation, strongly dependant on the operating conditions of the fuel cell in which the membrane is used. It has been observed that under accelerated load cycling conditions, membrane degradation is more severe in the active area-seal edge region compared to the rest of the active area. Although the reasons for such degradation are not fully understood, they perhaps include local conditions of heat and/or dryness. Still further, most of the prior art addresses only one of the components of membrane degradation—either mechanical or chemical—and most offer solutions that target solely chemical causes of membrane degradation.

SUMMARY

An ion exchange membrane in, or for, an electrochemical fuel cell comprises a polymer electrolyte membrane with cation exchange groups, typically acid functional groups, and having alkali metal ions at least partially ion-exchanged with the protons in acid functional group(s) of the membrane. The alkali metal ions are those from the group consisting of $Li^+$, $Na^+$, $K^+$, $Rb^+$, and $Cs+$. Although $Fr^+$ is technically also an alkali metal ion, its radioactivity excludes it from practical usage in these applications. Sulfonated fluorocarbon membranes particularly benefit from such partial ion exchange by the alkali metal ions with the hydrogen ions (protons) in the sulfonic acid groups ($—SO_3H$). The $Na^+$ metal ion is one particular example of an alkali metal ion that is ion-exchanged with the hydrogen ions in the sulfonic acid group of the membrane. Membrane durability is enhanced by an increased extent of alkali metal ion exchange there into. This enhanced durability arises from modification of the structural make up of the membrane itself, as contrasted with use of an additive for attacking the hydrogen peroxide. Further, the enhanced durability is with respect to relatively diminished aspects of both the mechanical and the chemical components of degradation.

A polymer electrolyte membrane, as of a perflourinated sulfonic acid (PFSA) polymer or the like, has alkali metal ions at least partially ion-exchanged there into by the method of relatively bathing the membrane, or a selected region thereof, in a solution containing the alkali metal ions. The ion exchange process is relatively fast. An example method immerses the membrane in a NaOH solution for a sufficient interval, typically at least about an hour and in the example, about 48 hours. The extent of ion exchange of alkali metal ions with the membrane is based on, or is a ratio of, the number of the alkali metal ions in the solution, versus the number of ion-exchange groups in the membrane. Ion exchange efficiency of 100% can be assumed due to the fact that protons are readily exchanged to alkali metal ions. The extent of ion-exchange may range from 1% to 100%.

The patterning of alkali metal ion exchange into a per-flourinated sulfonic acid polymer membrane may be controlled to achieve enhanced durability in selected areas or regions of the membrane, such as non-active edge regions, while maintaining membrane $H^+$ ion conductivity in non-ion-exchanged active areas of the membrane. The selective patterning may also include selected portions of the active region of the membrane if durability is an issue in those portions, as for example hot/dry areas of the membrane that result from the configuration of reactant and/or coolant flow fields. In addition to controlling durability of the membrane by patterning alone, it is possible to also use the concentration of the alkali metal ion as a variable, in which increased concentration results in greater durability but reduced conductivity. Thus, as used herein, the phrase "partially ion exchanged" may relate either to the general patterning of the exchanged ion make-up of the membrane, with some being ion exchanged and some not, or to the extent or concentration of the ion exchange in any particular location, or to both. In the latter instance, an example may include an entire membrane having alkali metal ions exchanged there into, but in differing concentrations in differing regions, typically to a lesser extent in the active region(s) requiring greater conductivity and to a greater extent in non-active regions and/or deterioration-prone active sub-regions.

DETAILED DESCRIPTION

Figure 1:
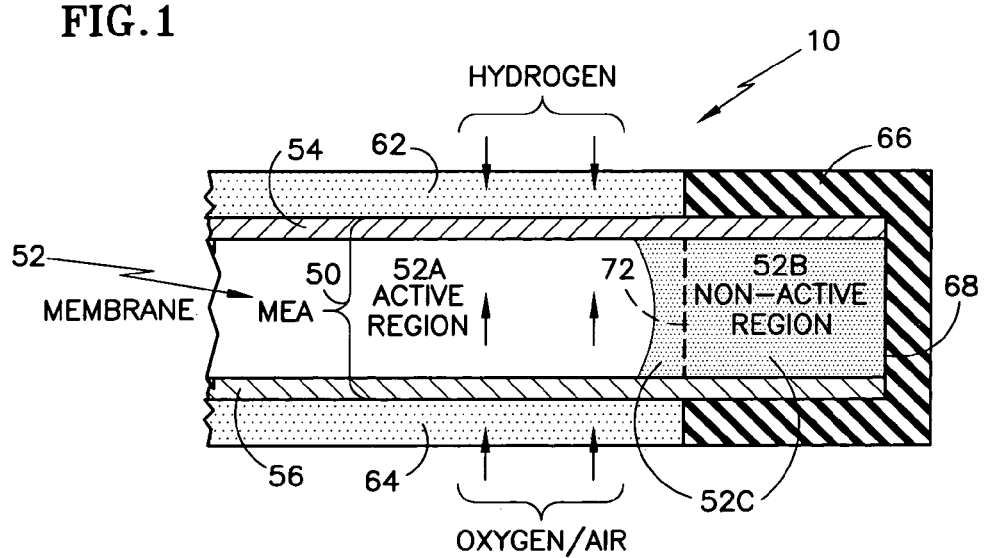
FIG. 1 schematically illustrates the edge region of a unitized electrode assembly (UEA) including an edge seal and membrane electrode assembly (MEA) having a membrane in accordance with the disclosure.

FIG. 1 shows a unitized electrode assembly (UEA) 10 including a membrane electrode assembly (MEA) 50 having a membrane 52, an anode 54 positioned to one side of membrane 52, and a cathode 56 positioned to the other side of membrane 52. Gas diffusion layers 62, 64 are positioned outside of electrodes 54, 56 and are used for introduction of reactants, hydrogen and oxygen, as shown in the drawing.

Also, as is well known in the art, a seal 66 is positioned at an edge 68 of membrane electrode assembly 50 for purposes of sealing UEA 10 to keep reactants separate. To further assist with an understanding of various aspects of the disclosure, the MEA 50, and particularly membrane 52, is depicted as having an Active Region 52A which is generally conductive, as indicated by charge flow arrows therein, and a Non-Active Region 52B which is typically isolated or shadowed from the flow of the reactants by the presence of the seal 66. The non-active region typically is in the region of the periphery of the membrane 52 and at least underlies the seal 66, as generally represented by the broken line 72, but may of course be somewhat greater or less than the bounds of the seal 66 itself and need not be as conductive as the active region. Moreover, the non-active region 52B under the seal 66 to the right of the broken line 72 and also a portion of the membrane somewhat to the left of that broken line is depicted as shaded in FIG. 1 and identified by reference number 52C to further emphasize the presence, or relatively increased concentration, of alkali metal ions, as will be described in greater detail.

The composition of a typical membrane 52 in a typical MEA is of a fluoropolymer or similar non-flourinated polymer having an acid functional group, with a typical example being a perflourosulfonic acid/PTFE co polymer membrane available from DuPont Inc. under the trade name Nafion®. It has been found that substitution of alkali metal ions for at least some of the hydrogen ions in the conventional acid functional groups that otherwise exist in the copolymer membrane serves to enhance the durability of the membrane, at least in the region(s) of the membrane where such substitution of ions occurs. While not wishing to be bound thereby, it is believed that the substitution of $H^+$ ions with alkali metal ions stabilizes the vulnerable membrane sites which are prone to chemical, mechanical and/or thermal degradation, thus increasing the overall membrane stability and durability. The extent to which this ion exchange is taken, perhaps expressed as exchanged ion concentration, may vary from as low as 0% or 1%, to as high as 100%, with the need for conductivity and/or cost of making the exchange being two major factors to be considered in establishing that value.

Substitution of any of the alkali metal ions ($Li^+$, $Na^+$, $K^+$, $Rb^+$, $Cs^+$) is believed to provide the advantages described. The following examples are presented in the context of $Na^+$ ions that are exchanged into the membrane, but of course the other alkali metals could be used instead, or in addition.

In the normal course of usage of polymer electrolyte membranes in fuel cells, the membrane material is typically supplied in the perflourosulfonic acid/P FEE copolymer form, from suppliers such as Dupont Inc, Gore, Asahi, and others. The DuPont product is sold under the well-known trade name Nafion®, and it and similar products of others may be referred to generally herein as "Nafion-like". In times past, the raw membrane material might have been supplied in a Na form in which the membrane had a—$SO_3Na$ group that would inhibit adequate $H^+$ ion conductivity. In such instance, the fuel cell maker typically needed to convert the membrane by replacing the Na with H, typically by the difficult process of boiling the membrane in acid. In either case, from that common starting point it is then possible to selectively ion-exchange the desired alkali metal ions for the functional acid group as described herein.

Referring to one example formulation, perflourosulfonic acid/PTFE copolymer membrane material, "as—received" from the manufacturer, was ion exchanged with $Na^+$ ions by immersing the material in NaOH solution at room temperature for approximately 48 hours. The % ion exchange reported is the maximum possible amount based on the amount of alkali metal ions present in the salt solution relative to the amount of ion-exchange groups. The % ion-exchange is defined by the following formula:

% ion-exchange=(Number of moles of alkali metal ions/Total number of moles of ion-exchange groups in the membrane)*100.

More specifically in the example, a NaOH solution was prepared by dissolving 10.6 mg NaOH ($2.7 \times 10^{-4}$ moles of $Na^+$) in 200 $cm^3$ of deionized water. A piece of Nafion 112 membrane material weighing 0.59 gm ($5.4 \times 10^{-4}$ moles of $SO_3^-$ or $H^+$) was immersed in the NaOH solution for a sufficient interval, typically 1 hour or more, and in this instance ~48 hours. The maximum possible % ion-exchange at that particular concentration is 50%. It will be appreciated, however, that by relatively increasing or decreasing the amount of $Na^+$ for a given quantity of membrane material, it is possible to control the extent of ion-exchange there into from as little as 0-1% to as much as 100%.

Although it is possible in one aspect of the disclosure to subject the entire membrane 52 to a singular partial ion-exchange process to introduce a selected, limited quantity of alkali metal ions and provide the entirety of the membrane with some increased durability, it will be realized that the active region will similarly experience a relative decrease in $H^+$ ion conductivity. An arrangement that appears to optimize benefits involves the partial, or selective, ion-exchange of the alkali metal ions into the membrane, with a relatively greater concentration of alkali metal ions being in the non-active and deterioration-prone regions of the membrane. While such arrangement includes a finite but lesser concentration of ion-exchanged alkali metal ions in the active region of the membrane, a more typical arrangement tends to focus or limit the region of ion-exchanged alkali metal ions to the non-active peripheral region and any additional deterioration-prone regions, or sub-regions, of the membrane.

Figure 2:
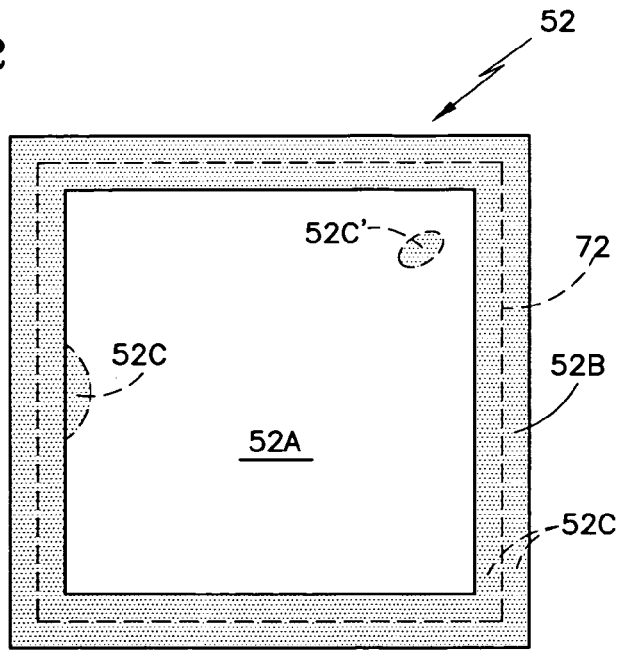
FIG. 2 is a simplified plan-form view of a membrane showing a predominantly $H^+$ form active region and a predominantly ion-exchanged region, or regions, in accordance with an aspect of the disclosure.

Referring to FIG. 2, there is depicted, in plan form, a membrane 52 in accordance with an aspect of the disclosure, illustrating a central active region 52A having relatively little or probably no, alkali metal ions exchanged there into, and one or more ion-exchanged regions 52C having a relatively greater concentration of alkali metal ions exchanged there into. As depicted, the predominant ion-exchanged region 52A is the peripheral region of the membrane 52, including the non-active region 52B under the seal, as well as a regular and/or irregular continuum extending a limited distance into the active region from the seal line 72. Still further, to the extent there are discrete isolated regions of the membrane active area that are prone to degradation, the alkali metal ions may also be selectively exchanged into those discrete regions, as depicted by ion-exchanged "island" 52C'.

With respect to the partial ion-exchange described, and realizing that the term "partial" refers to the patterning of the alkali metal ion exchange in the membrane, or the extent of ion exchange at a location, or both, it will be understood that such partial ion exchange can be accomplished in a variety of ways. To the extent there is to be a particular extent (%) of ion exchange at a particular location or region, a solution is prepared to provide the required percentage of moles of alkali metal ions relative to the total number of moles of ion-exchange groups in the relevant membrane portion. To the extent an ion exchange is to occur at a particular region or location, that particular region or location of the membrane is placed in contact with the requisite salt solution for the interval required. That contact between the membrane and salt solution is of sufficient duration for the ion-exchange, e. g., 1 hour or more, and in this instance, for convenience, 48 hours. This is readily accomplished by immersing at least the relevant regions of the membrane in the salt solution, though other techniques are also acceptable. The immersion of the membrane in a solution may be done selectively by region, or groups of regions, to be ion exchanged, and/or the active region that is not to be ion-exchanged may be masked prior to immersion.

Reference is made to Table 1 following, for a contrasting example of the advantages derived from partially ion-exchanging alkali metal ions with the $H^+$ ions of the acid functional group of a polymer having such acid functional group.

TABLE 1

| Membrane | Form | Test Conditions | FER µmol/(h cm2) | Lifetime (h) |
|---|---|---|---|---|
| Membrane A | As-Received | 80 C., 30% RH H2/O2, OCV | 0.155 | 260 |
| | 10% Na+ | | 0.054 | 650 |
| | 50% Na+ | | 0.019 | >710 |
| | As-Received | 80 C., 30% RH H2/O2, Load Cycling | 0.012 | 426 |
| | 10% Na+ | | 0.003 | >1100 |
| Membrane B | As-Received | 90 C., 30% RH H2/O2, OCV | 0.842 | >40 |
| | 50% Na+ | | 0.062 | >92 |

Both Membrane A and Membrane B are "Nafion-like", with Membrane A further having an additional support structure therein. The Membrane A was tested in the "as-received" form, as well as with 10% and 50% of the $H^+$ ions of the sulfonic acid group replaced by ion-exchange with $Na^+$ ions. The Membrane B was tested in the "as-received" form and with 50% of the $H^+$ ions of the sulfonic acid group replaced by ion-exchange with $Na^+$ ions. Both membranes were tested in the context or configuration of an operating fuel cell. Membrane A was tested under both accelerated open circuit voltage (OCV) conditions and load cycling conditions, with each test being conducted at 80° C., 30% relative humidity and with $O_2$ and $H_2$ as the reactants. Membrane B was tested under only accelerated open circuit voltage (OCV) conditions, with the tests being conducted at 90° C., 30% relative humidity and with $O_2$ and $H_2$ as the reactants. The parameters being monitored and measured were the fluoride emission rate (FER), as measured in µmol/(h cm$^2$), and Lifetime, as measured in hours (h).

It will be noted that the fluoride emission rates of both membranes A and B decreased significantly for those forms containing partial alkali metal ion exchange, relative to those in the "as-received" form not having the alkali metal ions. That measure of improvement is typically a factor of at least about three (0.155/0.054) and may range to 14(0.842/0.062) or more. Generally commensurate with the improvement (decline) in the fluoride emission rates, the Lifetimes of the membranes also increased significantly. The tests for the Membranes having Lifetime values possessing a ">" symbol were stopped prior to the membranes failing, whereas the values for the remainder represent time-to-failure. It is clear that the lifetimes were typically doubled or tripled with the partial ion exchange of alkali metal ions of 10% or greater. Thus, it may be concluded that the partial ion exchange of alkali metal ions with the $H^+$ ions of the acid functional group of a typical PEM fuel cell membrane is significantly beneficial in improving the durability of the membrane.

In addition to the foregoing, the Membrane A sample having the 10% $Na^+$ ion-exchanged content that underwent the load cycling test, was analyzed after the test, ie., after 1100 hours, for the presence of $Na^+$ in the membrane to determine the stability of the ion-exchange. The analysis revealed little or no loss of the $Na^+$, thereby confirming the stability of the exchange.

Although the disclosure has been described and illustrated with respect to the exemplary embodiments thereof, it should be understood by those skilled in the art that the foregoing and various other changes, omissions and additions may be made without departing from the spirit and scope of the disclosure.

What is claimed is:

1. An ion exchange membrane for a fuel cell, the ion exchange membrane comprising a polymer having an acid functional group normally including $H^+$ ions, and having alkali metal ions partially ion-exchanged with the $H^+$ ions of the acid functional group of the ion exchange membrane to provide a patterning of the alkali metal ion exchange across a planar area of the ion exchange membrane such that the partial ion exchange of alkali metal ions is for a portion of the planar area of the ion exchange membrane that is less than the entirety.

2. The ion exchange membrane of claim 1 wherein the alkali metal ions are from the group consisting of: $Li^+$, $Na^+$, $K^+$, $Rb^+$, and $Cs^+$.

3. The ion exchange membrane of claim 2 wherein the alkali metal ions are $Na^+$.

4. The ion exchange membrane of claim 1 wherein the acid functional group is $SO_3H$.

5. The ion exchange membrane of claim 1 wherein the polymer is selected from the group consisting of hydrocarbon-based polymers and fluorocarbon-based polymers.

6. The ion exchange membrane of claim 1 wherein the percentage of alkali metal ions exchanged with the acid functional group of the polymer is greater than about 1%.

7. The ion exchange membrane of claim 6 wherein the percentage of alkali metal ions exchanged with the acid functional group of the polymer is at least about 10%.

8. The ion exchange membrane of claim 1 wherein the percentage of alkali metal ions exchanged with $H^+$ ions of the acid functional group of the polymer is in the range of 1% to 100%.

9. The ion exchange membrane of claim 1 wherein the membrane includes a peripheral region to be positioned under a seal, and the portion of the membrane into which the alkali metal ions are exchanged includes said peripheral region.

10. The ion exchange membrane of claim 9 wherein the portion of the membrane into which the alkali metal ions are exchanged additionally includes a discrete region isolated from said peripheral region.

11. A unitized electrode assembly for a fuel cell, comprising:

an ion exchange membrane, the ion exchange membrane being a sulfonated, hydrocarbon polymer having protons for ion exchange, and having alkali metal ions partially ion-exchanged with the protons of the ion exchange membrane to provide a patterning of the alkali metal ion exchange across a planar area of the ion exchange membrane, or a particular extent of alkali metal ion exchange that differs at respective locations across the planar area of the ion exchange membrane, or both, and the ion exchange membrane having a peripheral edge and a peripheral region adjacent its peripheral edge;

an anode positioned to one side of the membrane;

a cathode positioned to the other side of the membrane; and a seal at the peripheral region of the membrane.

12. The unitized electrode assembly of claim 11 wherein the sulfonated, hydrocarbon polymer of the ion exchange membrane is at least partially fluorinated.

13. The unitized electrode assembly of claim 11 wherein the partial ion exchange of alkali metal ions is for a portion of the planar area of the ion exchange membrane that is less than the entirety, the portion of the ion exchange membrane into which the alkali metal ions are exchanged includes said peripheral region.

14. A method for modifying the polymer of a polymer electrolyte membrane for a fuel cell to produce the ion exchange membrane of claim 1, the method comprising:

preparing a solution containing alkali metal ions; and bathing a portion of the polymer electrolyte membrane material in the solution containing alkali metal ions to ion-exchange alkali metal ions into the membrane material to produce the ion exchange membrane having alkali metal ions partially ion-exchanged with the $H^+$ ions of the acid functional group.

15. The method of claim 14 wherein the solution containing alkali metal ions is a salt solution of NaOH and water; and wherein bathing the portion of the polymer electrolyte membrane material in the salt solution includes bathing the portion of the polymer electrolyte for at least about one hour.

* * * * *